(12) United States Patent
Hasegawa et al.

(10) Patent No.: US 10,147,923 B2
(45) Date of Patent: Dec. 4, 2018

(54) LAMINATED POROUS FILM, METHOD FOR PRODUCING SAME, NON-AQUEOUS ELECTROLYTE SECONDARY BATTERY SEPARATOR, LAMINATED ELECTRODE SHEET, AND NON-AQUEOUS ELECTROLYTE SECONDARY BATTERY

(71) Applicant: SUMITOMO CHEMICAL COMPANY, LIMITED, Chuo-ku, Tokyo (JP)

(72) Inventors: Hirohiko Hasegawa, Niihama (JP); Yasunori Nishida, Niihama (JP); Yasuo Shinohara, Tsukuba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 86 days.

(21) Appl. No.: 14/358,121

(22) PCT Filed: Oct. 30, 2012

(86) PCT No.: PCT/JP2012/078001
§ 371 (c)(1),
(2) Date: May 14, 2014

(87) PCT Pub. No.: WO2013/073362
PCT Pub. Date: May 23, 2013

(65) Prior Publication Data
US 2014/0302389 A1    Oct. 9, 2014

(30) Foreign Application Priority Data

Nov. 18, 2011  (JP) ................................ 2011-252956
Mar. 16, 2012  (JP) ................................ 2012-060761

(51) Int. Cl.
| | | |
|---|---|---|
| *H01M 2/16* | (2006.01) | |
| *H01M 2/14* | (2006.01) | |
| *H01M 4/66* | (2006.01) | |
| H01M 10/052 | (2010.01) | |

(52) U.S. Cl.
CPC ........... *H01M 2/145* (2013.01); *H01M 2/166* (2013.01); *H01M 2/1646* (2013.01); *H01M 2/1653* (2013.01); *H01M 2/1686* (2013.01); *H01M 4/666* (2013.01); *H01M 4/667* (2013.01); *H01M 10/052* (2013.01)

(58) Field of Classification Search
CPC .. H01M 2/1646; H01M 2/1653; H01M 2/166; H01M 2/1686; H01M 2/145; H01M 4/666; H01M 4/667; H01M 10/052
See application file for complete search history.

(56) References Cited

U.S. PATENT DOCUMENTS

| | | | |
|---|---|---|---|
| 7,670,717 B2 | 3/2010 | Ohata et al. | |
| 8,313,865 B2 | 11/2012 | Nishida et al. | |
| 2004/0185342 A1* | 9/2004 | Takeuchi | C08G 61/122 429/213 |
| 2005/0266305 A1* | 12/2005 | Ohata | H01M 2/1646 429/144 |
| 2007/0281206 A1* | 12/2007 | Fujikawa | H01M 2/145 429/62 |
| 2009/0219672 A1* | 9/2009 | Masuda | H01G 9/02 361/502 |
| 2010/0112432 A1* | 5/2010 | Nishida | H01M 2/1653 429/144 |

FOREIGN PATENT DOCUMENTS

| | | |
|---|---|---|
| CN | 1938882 A | 3/2007 |
| CN | 101641808 A | 2/2010 |
| JP | 2000-030686 A | 1/2000 |
| JP | 2003-317695 A | 11/2003 |
| JP | 2004-227972 A | 8/2004 |
| JP | 2006-331760 A | 12/2006 |
| JP | 2007-311151 A | 11/2007 |
| JP | 2010-123383 A | 6/2010 |
| KR | 2006-0122953 A | 11/2006 |
| KR | 2009-0122395 A | 11/2009 |
| WO | 2005/117169 A1 | 12/2005 |

(Continued)

OTHER PUBLICATIONS

First Office Action dated Feb. 10, 2015 in corresponding Chinese Patent Application No. 201280056194.6 with translation.
Office Action dated May 10, 2016, by the Japanese Patent Office in corresponding application No. JP 2013-544203 with English translation.
Third Office Action dated May 10, 2016, by the State Intellectual Property Office of the P.R.C. in corresponding application No. CN 201280056194.6 with English translation.
Communication dated Dec. 29, 2017 from the State Intellectual Property Office of the P.R.C. in counterpart Chinese application No. 201280056194.6.

(Continued)

*Primary Examiner* — Michael L Dignan
(74) *Attorney, Agent, or Firm* — Sughrue Mion, PLLC

(57) ABSTRACT

Provided is a laminated porous film suitable as a non-aqueous electrolyte secondary battery separator, which includes a heat resistant layer excellent in morphological stability at a high temperature and ion permeability and more resistant to fall-off of a filler. A laminated porous film in which a heat resistant layer including a binder resin and a filler and a base porous film including a polyolefin as a principal component are laminated, wherein the filler included in the heat resistant layer substantially consists of an inorganic filler (a) having a primary particle diameter of 0.2 to 1 μm and an inorganic filler (b) having a primary particle diameter of 0.01 to 0.1 μm, and the particle diameter of secondary aggregates of the inorganic filler (b) is not more than 2 times the primary particle diameter of the inorganic filler (a) in the heat resistant layer.

5 Claims, No Drawings

(56) References Cited

FOREIGN PATENT DOCUMENTS

WO      2008/123331 A1    10/2008
WO      2009/123168 A1    10/2009

OTHER PUBLICATIONS

Communication dated Oct. 26, 2015, from the State Intellectual Property Office of the People's Republic of China in counterpart application No. 201280056194.6.
Decision of Reexamination dated Jul. 10, 2018, issued by the State Intellectual Property Office of the P.R.C. in corresponding application No. 201280056194.6.
Notification of Reasons for Refusal dated Oct. 4, 2018, issued in counterpart KR Application 10-2014-7013073.

\* cited by examiner

LAMINATED POROUS FILM, METHOD FOR PRODUCING SAME, NON-AQUEOUS ELECTROLYTE SECONDARY BATTERY SEPARATOR, LAMINATED ELECTRODE SHEET, AND NON-AQUEOUS ELECTROLYTE SECONDARY BATTERY

CROSS REFERENCE TO RELATED APPLICATIONS

This application is a National Stage of International Application No. PCT/JP2012/078001 filed Oct. 30, 2012, claiming priority based on Japanese Patent Application Nos. 2011-252956 filed Nov. 18, 2011 and 2012-060761 filed Mar. 16, 2012, the contents of all of which are incorporated herein by reference in their entirety.

TECHNICAL FIELD

The present invention relates to a laminated porous film suitable as a non-aqueous electrolyte secondary battery separator, and a laminated electrode sheet, and a non-aqueous electrolyte secondary battery including the laminated porous film and/or electrode sheet.

BACKGROUND ART

A non-aqueous electrolyte secondary battery, particularly a lithium secondary battery has high energy density, and is therefore widely used as a battery to be used for a personal computer, a mobile phone, a portable information terminal and the like.

Non-aqueous electrolyte secondary batteries typified by the lithium secondary battery have high energy density, so that if an internal short circuit/external short circuit occurs due to damage to the battery or damage to a device using the battery, or the like, heavy current flows to generate heat. Therefore, the non-aqueous electrolyte secondary battery is demanded to secure a high level of safety by preventing heat generation that exceeds a certain level.

As means for securing the safety, a method for providing a shutdown function to prevent additional heat generation by blocking passage of ions between positive and negative electrodes by a separator in case of abnormal heat generation is commonly used. Examples of the method for causing a separator to have a shutdown function include a method in which a porous film consisting of a material that is melted at the time of abnormal heat generation is used as a separator. That is, in a battery using the separator, at the time of abnormal heat generation, the porous film is melted and made non-porous to block passage of ions, so that additional heat generation can be suppressed.

As the separator having a shutdown function, for example, a polyolefin porous film is used. At the time of abnormal heat generation in the battery, a separator consisting of the polyolefin porous film is melted and made non-porous at about 80 to 180° C. to block (shut down) passage of ions, thereby suppressing additional heat generation. However, in the case of intensive heat generation etc., a separator consisting of the aforementioned porous film may come into direct contact with each other due to shrinkage, film breakage or the like, leading to occurrence of a short-circuit. Thus, a separator consisting of a polyolefin porous film has insufficient morphological stability, so that abnormal heat generation due to a short-circuit may not be suppressed in some cases.

As a measure for improvement, some non-aqueous electrolyte secondary battery separators excellent in morphological stability at a high temperature have been proposed. As one means thereof, there has been proposed a non-aqueous electrolyte secondary battery separator consisting of a laminated porous film in which a heat resistant layer including a filler of fine particles and a porous film as a base principally including a polyolefin (hereinafter, referred to as a "base porous film" in some cases) are laminated (see, for example, Patent Document 1). In such a separator, suppressing fall-off of a filler from the surface of a laminated porous film is one of the challenges.

When the filler falls off from the separator, physical properties expected as a separator are not exhibited, or a process failure occurs such as contamination of equipment with a powder (filler) falling off at the time of assembling a battery.

When simply the amount of a binder is increased as a method for suppressing fall-off of a filler as described above, ion permeability etc. is reduced, and therefore there have been proposed a method in which the surface of a filler is modified (see, for example, Patent Document 2), a method in which characteristics are imparted to the chemical structure of a binder resin for binding a filer (see, for example, Patent Document 3), and a method in which the average fiber diameter of fibers to fix a filler and the particle diameter of the filler are controlled to have a predetermined relationship (see, for example, Patent Document 4).

However, it is difficult to say that suppression of fall-off of a filler by these methods is sufficient, and further improvement is required.

The non-aqueous electrolyte secondary battery includes a positive electrode sheet and a negative electrode sheet with a positive electrode mixture or a negative electrode mixture carried on a sheet-shaped collector, and has a structure in which the positive electrode sheet, the separator and the negative electrode sheet are laminated in this order.

Such a positive electrode sheet and negative electrode sheet (hereinafter, referred to collectively as an "electrode sheet" in some cases) may also be used as a laminated electrode sheet provided with a heat resistant layer for preventing a short-circuit at the time of abnormal heat generation in the battery.

Such a laminated electrode sheet having a heat resistant layer has the challenge of suppressing fall-off of a filler as in the case of the separator.

PRIOR ART DOCUMENTS

Patent Documents

Patent Document 1: Japanese Patent Laid-open Publication No. 2004-227972
Patent Document 2: Japanese Patent Laid-open Publication No. 2007-311151
Patent Document 3: International Publication No. WO 2009/123168
Patent Document 4: Japanese Patent Laid-open Publication No. 2006-331760

SUMMARY OF THE INVENTION

Problems to be Solved by the Invention

An object of the present invention is to provide a laminated porous film including a heat resistant layer which has high uniformity, is excellent in morphological stability at a high temperature and ion permeability, and is more resistant to fall-off of a filler, and a non-aqueous electrolyte secondary battery including the laminated porous film as a separator. Another object of the present invention is to provide a laminated electrode sheet including a heat resistant layer similar to that of the laminated porous film, and a non-aqueous electrolyte secondary battery including the electrode sheet.

Solutions to the Problems

The present invention provides the following.
<1> A laminated porous film in which a heat resistant layer including a binder resin and a filler and a base porous film including a polyolefin as a principal component are laminated,
wherein the filler included in the heat resistant layer substantially consists of an inorganic filler (a) having a primary particle diameter of 0.2 to 1 μm and an inorganic filler (b) having a primary particle diameter of 0.01 to 0.1 μm, and
the particle diameter of secondary aggregates of the inorganic filler (b) is not more than 2 times the primary particle diameter of the inorganic filler (a) in the heat resistant layer.
<2> The laminated porous film according to <1>, wherein the volume ratio of the inorganic filler (a) to the inorganic filler (b) is 80/20 to 99/1.
<3> The laminated porous film according to <1> or <2>, wherein the inorganic filler (a) includes, as a principal component, nonspherical coupled particles in which a plurality of primary particles are firmly stuck together.
<4> The laminated porous film according to any one of <1> to <3>, wherein both the inorganic filler (a) and the inorganic filler (b) are alumina.
<5> The laminated porous film according to any one of <1> to <4>, wherein the binder resin is a water-soluble polymer.
<6> A method for producing the laminated porous film according to any one of <1> to <5>,
wherein a coating fluid containing an inorganic filler (a), an inorganic filler (b) produced by a gas phase method, a binder resin and a solvent is applied to the surface of the base porous film, and the solvent is then removed to form a heat resistant layer on the surface of the base porous film.
<7> A non-aqueous electrolyte secondary battery comprising as a separator the laminated porous film according to any one of <1> to <5>.
<8> A laminated electrode sheet in which a heat resistant layer including a binder resin and a filler and an electrode sheet are laminated,
wherein the filler included in the heat resistant layer substantially consists of an inorganic filler (a) having a primary particle diameter of 0.2 to 1 μm and an inorganic filler (b) having a primary particle diameter of 0.01 to 0.1 μm, and
the particle diameter of secondary aggregates of the inorganic filler (b) is not more than 2 times the primary particle diameter of the inorganic filler (a) in the heat resistant layer.
<9> A non-aqueous electrolyte secondary battery comprising the laminated electrode sheet according to <8>.

Effects of the Invention

According to the present invention, there are provided a laminated porous film suitable as a non-aqueous electrolyte secondary battery separator, which includes a heat resistant layer having high uniformity, being resistant to fall-off of a filler and having high shape maintainability during heating and which is excellent in ion permeability, and a laminated electrode sheet including the heat resistant layer.

EMBODIMENTS OF THE INVENTION

The present invention will be described in detail below. When the value range expression of "$v_1$ to $v_2$ (where $v_1$ and $v_2$ are arbitrary values)" is used, the values of $v_1$ and $v_2$ are encompassed in the value range.

In a laminated porous film, a heat resistant layer (hereinafter, referred to as a layer B in some cases) is a layer formed by binding with a binder resin an inorganic filler forming a principal skeleton, and has heat resistance at a temperature at which a base porous film (hereinafter, referred to as a layer A in some cases) is made non-porous, so that a function of shape maintainability is imparted to the laminated porous film.

The base porous film tends to be melted and made non-porous at a high temperature, and therefore at the time of abnormal heat generation, the base porous film is melted and made non-porous to impart a shutdown function to the laminated porous film when the laminated porous film is used as a separator. Details of the layers A and B will be described later.

<Heat Resistant Layer>

The heat resistant layer (layer B) will be described in detail below.

Specific examples of the inorganic filler that forms the heat resistant layer include fillers of materials such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite and glass. As the inorganic filler, the above-mentioned materials may be used alone or used as a mixture of two or more thereof.

The inorganic filler is more preferably an inorganic oxide, further more preferably alumina, from the viewpoint of heat resistance and chemical stability.

Alumina includes numerous crystal forms such as α-alumina, β-alumina, γ-alumina and θ-alumina, all of which can be suitably used. Among them, α-alumina is especially preferred because of its particularly high thermal and chemical stability.

The inorganic filler included in the heat resistant layer substantially consists of a filler (a) having a primary particle diameter of 0.2 to 1 μm and a filler (b) having a primary particle diameter of 0.01 to 0.1 μm. Here, the phrase "substantially consists (of filler (a) and filler (b))" means that the total weight of the filler (a) and the filler (b) is 90% or more of the total filler weight. The total weight of the filler (a) and the filler (b) is preferably 95% or more, more preferably 100%, of the total filler weight.

By using the inorganic filler (a) and the inorganic filler (b) in combination, a heat resistant layer can be obtained which hardly suffers from fall-off of a filler, has a proper gas permeability and is microscopically uniform.

The particle diameter of secondary aggregates of the inorganic filler (b) is not more than 2 times the primary particle diameter of the inorganic filler (a) in the heat resistant layer.

When the inorganic fillers (a) and (b) satisfy this particle diameter requirement as well as the above-described primary particle diameter ranges, a heat resistant layer having a structure which is uniform and has a high bonding strength between inorganic fillers is obtained.

The particle diameter and shape of a filler included in the heat resistant layer are determined by observing the cross section of the heat resistant layer with a scanning electron microscope (SEM).

Specifically, the cross section of the heat resistant layer is observed with SEM at an accelerating voltage of 2 kV and a magnification of 10000. The particle diameter of particles other than secondary aggregates and coupled particles is defined as a primary particle diameter of the inorganic filler (a) or the inorganic filler (b), and the particle diameter of the largest secondary aggregate of secondary aggregates of the inorganic filler (b) is defined as a particle diameter of secondary aggregates of the inorganic filler (b).

The method for preparing a cross section of the heat resistant layer is not limited as long as a cross section can be obtained, and an appropriate method is selected in consideration of ease of processing the laminated porous film. Specifically, there is a method in which the laminated porous film itself or a sample obtained by filling pores of the layer A with a filler as necessary is cut with a razor blade or a microtome, frozen and cut in liquid nitrogen, or cut by an Ar ion beam or a Ga ion beam.

The ratio of inorganic filler (a)/inorganic filler (b) is preferably 80/20 to 99/1, more preferably 85/15 to 97/3 in terms of a volume ratio in that the uniformity of the heat resistant layer is high, the amount of water stuck on the surface of the inorganic filler is reduced, and particles forming the filler can be efficiently bonded with a small amount of a binder.

The materials of the inorganic filler (a) and the inorganic filler (b) may be the same, or different from each other.

As described later, the heat resistant layer can be formed by applying a base porous film a coating fluid containing an inorganic filler, a binder and a solvent, and removing the solvent from the obtained coating film. The solvent can act as a dispersion medium.

Here, for obtaining a heat resistant layer having higher performance, it is preferred to form a heat resistant layer using a coating fluid in which the inorganic filler (b) having intrinsically a high cohesive strength is more uniformly dispersed.

Means for enhancing dispersibility of an inorganic filler in such a coating fluid include selection of a solvent and use of an additive during preparation of the coating fluid, and optimization of dispersion conditions, but use of the inorganic filler (b) having high dispersibility is most convenient and preferred.

As the inorganic filler (b) having high dispersibility, an inorganic filler produced by a gas phase method is preferably used. An inorganic filler produced by a gas phase method tends to have high dispersibility as compared to an inorganic filler produced by a solid phase method or a liquid phase method even though the material of the inorganic filler is the same. Examples of the gas phase method include a chemical vapor deposition method and a physical vapor deposition method.

For enhancing dispersibility of the inorganic filler, the surface of the inorganic filler may be modified with a surface functional group appropriate to a solvent used.

The inorganic filler takes various shapes such as a spherical shape, an elliptical shape, a rectangular shape, a gourd shape and an indefinite shape that is not specified as a certain shape, depending on a method for producing an inorganic filler material and dispersion conditions at the time of preparing a coating fluid, and an inorganic filler in any of these shapes can be used.

Here, the inorganic filler (a) is more preferably in the form of nonspherical coupled particles in which a plurality of primary particles are firmly stuck together.

When the inorganic filler (a) is in the form of nonspherical coupled particles, the filling factor is decreased, so that a heat resistant layer which has a higher porosity and is excellent in ion permeability can be formed.

The nonspherical coupled particle includes preferably 2, further preferably 4 to 30 primary particles on average. Here, the number of primary particles in the nonspherical coupled particle is an average of the number of primary particles counted for each of 5 nonspherical coupled particles randomly extracted under SEM observation.

Preferably, the nonspherical coupled particles of the inorganic filler (a) are partially melted and firmly stuck together by heating. When the nonspherical coupled particles are in this form, fall-off of primary particles from nonspherical coupled particles can be avoided at the time of preparing a coating fluid described later.

The content of the inorganic filler is preferably 60% by volume or more, more preferably 70% by volume or more, further more preferably 80% by volume or more where the volume of the heat resistant layer is 100% by volume except for void portions, in that in the heat resistant layer, voids formed by contact between particles forming the inorganic filler are inhibited from being closed by other constituent materials such as a binder to keep better ion permeability. The upper limit of the content of the inorganic filler is normally 98% by volume or less where the volume of the heat resistant layer is 100% by volume except for void portions.

The binder resin is preferably a resin which has a capability of binding particles forming the inorganic filler, and the inorganic filler and the base porous film, and is insoluble in an electrolyte solution of the battery and electrochemically stable under use conditions of the battery.

Examples of the binder resin include polyolefins such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; rubbers such as styrene-butadiene copolymers and hydrogenated copolymers thereof, methacrylic acid ester copolymers, acrylonitrile-acrylic acid ester copolymers, styrene-acrylic acid ester copolymers, ethylene propylene rubber and polyvinyl acetate; resins having a melting point or glass transition temperature of 180° C. or higher, such as polyphenylene ether, polysulfone, polyether sulfone, polyphenylene sulfide, polyether imide, polyamide imide, polyether amide and polyester; and polyvinyl alcohol, polyethylene glycol, cellulose ether, sodium alginate, polyacrylic acid, polyacrylamide and polymethacrylic acid.

Among the binder resins, water-soluble polymers are preferred from the viewpoint of process and environmental loads because as a solvent, a solvent that principally includes water can be used. Use of such a water-soluble polymer is also preferred in that the effect of the present invention is more significantly exhibited because a binder resin is more selectively concentrated on the inorganic filler (b) having a large number of contact points per volume.

Among the water-soluble polymers, at least one selected from the group consisting of cellulose ether, starch, polyvinyl alcohol and sodium alginate is preferred, and particularly at least one selected from the group consisting of a cellulose ether (carboxyalkyl cellulose, alkyl cellulose and hydroxyalkyl cellulose) and polyvinyl alcohol.

Specific examples of the cellulose ether include carboxymethyl cellulose (CMC), hydroxyethyl cellulose (HEC), carboxyethyl cellulose, methyl cellulose, ethyl cellulose, cyanoethyl cellulose and oxyethyl cellulose. Among them, CMC and HEC which have excellent chemical stability are preferred, and particularly CMC is preferred.

The thickness of the layer B is normally in a range of 0.1 μm to 10 μm, preferably in a range of 2 μm to 6 μm. When a non-aqueous electrolyte secondary battery is produced, load characteristics of the battery may be deteriorated when the thickness of the layer B is excessively large. If abnormal heat generation occurs in the battery, the separator may be shrunk as thermal shrinkage of the layer A consisting of a polyolefin cannot be sustained when the thickness of the layer B is excessively small. When the layer B is formed on each of both surfaces of the layer A, the thickness of the layer B is the total thickness of the layers on both the surfaces.

The gas permeability of the layer B is preferably in a range of 0.1 to 100 seconds/100 cc, more preferably in a range of 1 to 80 seconds/100 cc in terms of a Gurley value. Here, the gas permeability is a value obtained by subtracting the gas permeability of the layer A from the gas permeability of the laminated porous film, and an increase in Gurley value due to formation of an interface between the layer A and the layer B is also included in the gas permeability of the layer B.

As the value of the gas permeability becomes smaller within the above-mentioned range, more sufficient ion permeability and cycle characteristics are shown and higher load characteristics can be exhibited as a battery when the laminated porous film is used to produce a non-aqueous electrolyte secondary battery.

The layer B is comprised of a porous film. The average pore diameter of the layer B is preferably 3 μm or less, further preferably 1 μm or less in terms of an average of diameters where the pore is approximated to a spherical shape. When the average pore diameter is more than 3 μm, the problem may arise that a short circuit easily occurs if a carbon powder as a principal component of positive and negative electrodes or a small piece thereof falls off. The average pore diameter can be determined by a gas adsorption method, a mercury porosimetry, a bubble point method or the like.

The porosity of the layer B is preferably 30 to 90% by volume, more preferably 40 to 85% by volume.

<Base Porous Film>

Next, the base porous film (layer A) will be described.

The base porous film has a structure in which coupled pores are provided in the film, so that a gas and a liquid can permeate from one surface to the other surface. The base porous film is a porous film including a polyolefin as a principal component, and serves as a base material of the laminated porous film.

The ratio of the polyolefin in the layer A is 50% by volume or more, preferably 90% by volume or more, more preferably 95% by volume or more of the total volume of the layer A.

Preferably, the polyolefin component of the layer A includes a high molecular weight component having a weight average molecular weight of $5 \times 10^5$ to $15 \times 10^6$. It is preferred that the layer A includes a polyolefin component having a weight average molecular weight of $1 \times 10^6$ or more because the strength of the layer A and then the strength of the laminated porous film including the layer A are enhanced.

Examples of the polyolefin include homopolymers or copolymers obtained by polymerizing ethylene, propylene, 1-butene, 4-methyl-1-pentene, 1-hexene and the like. Among them, polyethylene is preferred, and high molecular weight polyethylene having a weight average molecular weight of $1 \times 10^6$ or more is preferred.

The average particle diameter of the layer A is preferably 3 μm or less, further preferably 1 μm or less in that when the laminated porous film is used as a separator of the battery, it has sufficient ion permeability and ingress of particles into the positive electrode and negative electrode can be prevented. The average pore diameter can be determined by a gas adsorption method, a mercury porosimetry, a bubble point method or the like.

The gas permeability of the layer A is normally in a range of 30 to 500 seconds/100 cc, preferably in a range of 50 to 300 seconds/100 cc in terms of a Gurley value.

When the layer A has gas permeability in the above-mentioned range, sufficient ion permeability and cycle characteristics can be obtained when the laminated porous film is used as a separator.

The thickness of the layer A is appropriately determined in consideration of the thickness of the heat resistant layer of the laminated porous film.

When a coating fluid is applied to one or both of the surfaces of the layer A to form the layer B, the thickness of the layer A is preferably 4 to 40 μm, more preferably 7 to 30 μm, further more preferably 9 to 20 μm.

The porosity of the layer A is preferably 20 to 80% by volume, further preferably 30 to 70% by volume, and with this, excellent ion permeability is achieved, and a non-aqueous electrolyte secondary battery separator showing excellent characteristics is obtained. When the porosity is less than 20% by volume, the retention amount of the electrolyte solution may be decreased, and when the porosity is more than 80% by volume, a non-porous film may not be sufficiently made at a temperature at which shutdown occurs.

The basis weight of the layer A is normally 4 to 15 g/m², preferably 5 to 12 g/m² in that the strength, thickness, handling characteristics and weight of the laminated porous film, and the weight energy density and volume energy density of the battery when the laminated porous film is used as a separator can be enhanced.

The method for producing the layer A is not particularly limited, and examples thereof include a method in which a plasticizer is added to a thermoplastic resin and a film is formed, followed by removing the plasticizer with an appropriate solvent as described in Japanese Patent Laid-open Publication No. H7-29563, and a method in which a structurally weak amorphous portion of a film consisting of a thermoplastic resin produced by a known method is selectively stretched to form micropores as described in Japanese Patent Laid-open Publication No. H7-304110. For example, when the layer A is formed of a polyolefin resin including ultrahigh molecular weight polyethylene and a low molecular weight polyolefin having a weight average molecular weight of 10000 or less, it is preferred to produce the layer A by the method shown below from the viewpoint of production costs.

That is, the layer A can be obtained by a method including the steps of: (1) kneading 100 parts by weight of ultrahigh molecular weight polyethylene, 5 to 200 parts by weight of a low molecular weight polyolefin having a weight average molecular weight of 10000 or less, and 100 to 400 parts by weight of an inorganic filler such as calcium carbonate, to obtain a polyolefin resin composition;
(2) forming a sheet using the polyolefin resin composition;
(3) removing the inorganic filler from the sheet obtained in the step (2); and
(4) stretching the sheet obtained in the step (3) to obtain the layer A.

The layer A may be a commercial product, and preferably has the characteristics described above.

<Method for Producing Laminated Porous Film>

The method for producing a laminated porous film is not particularly limited as long as it is a method capable of obtaining a porous film in which the layer A and layer B described above are laminated, but a method is convenient and preferred in which a coating fluid containing an inorganic filler, a binder resin and a solvent is prepared, and applied directly to the surface of a base porous film, and the solvent is removed from the obtained coating film. In the case of the above-mentioned method, preferably at least the inorganic filler (b), of inorganic fillers (a) and (b), is an inorganic filler produced by the above-described gas phase method for enhancing dispersibility.

The solvent of the coating fluid is preferably one in which the inorganic filler and the binder resin can be uniformly and stably dissolved or dispersed. Specific examples of the solvent of the coating fluid include water, alcohols such as methanol, ethanol and isopropanol, acetone, toluene, xylene, hexane, N-methylpyrrolidone, N,N-dimethylacetamide and N,N-dimethylformamide, and they may be used alone, or two or more thereof may be mixed and used as long as they are mutually compatible.

The solvent may be water alone, but a mixed solvent of water and an organic polar solvent is preferred in that the drying/removal speed is increased, and sufficient solubility of the above-described water-soluble polymer is secured.

When the solvent is an organic solvent alone, leveling may be short because of an excessive increase of the drying speed, and when the above-described water-soluble polymer is used for the binder resin, solubility may be insufficient.

As the organic polar solvent to be used for the mixed solvent, an alcohol is preferred because it is compatible with water in any ratio and has a proper polarity, and methanol and ethanol are more preferred. The ratio of water and the organic polar solvent in the mixed solvent is selected in consideration of leveling characteristics and a type of binder resin to be used, and the water content in the mixed solvent is normally 50% by weight or more, preferably 70% by weight or more, more preferably 80% by weight or more. Regarding the upper limit, the water content in the mixed solvent is normally 99% by weight or less, preferably 97% by weight or less, more preferably 95% by weight or less.

The coating fluid may contain components other than the inorganic filler and the binder resin as necessary within the bounds of not significantly impairing the purpose of the present invention. Examples of the above-mentioned component include a dispersant, a plasticizer and a pH adjuster.

A method for dispersing or dissolving the inorganic filler and binder in a solvent to obtain a coating fluid is preferably a method for obtaining a homogeneous coating fluid.

Examples of the method may include a mechanical stirring method, an ultrasonic dispersion method, a high pressure dispersion method and a medium dispersion method, and the high pressure dispersion method is preferred in that the inorganic filler (b) can be easily uniformly dispersed without causing ingress of foreign matters.

For the mixing order, the inorganic filler, the binder resin and other components may be added to a solvent at once and mixed, or each component may be dissolved or dispersed in a solvent, followed by performing mixing as long as there is not a particular problem such as generation of precipitates.

The method for applying the coating fluid directly onto the base porous film is not particularly limited as long as it is a method capable of uniformly wet-coating the film, and a previously known method can be employed. For example, a capillary coating method, a spin coating method, a slit die coating method, a spray coating method, a dip coating method, a roll coating method, a screen printing method, a flexographic printing method, a bar coater method, a gravure coater method, a die coater method or the like can be employed. The thickness of the layer B to be formed can be controlled by adjusting the coating amount, the concentration of the binder resin in the coating fluid and the ratio of the filler to the binder resin.

When the layer B is laminated on both surfaces of the base porous film (layer A), a sequential lamination method in which the layer B is formed on one surface, followed by laminating the layer B on the other surface, or a simultaneous lamination method in which the layer B is simultaneously formed on both surfaces of the base porous film (layer A) can be employed.

Preferably, the base porous film is subjected to a hydrophilic treatment before the coating fluid is applied onto the base porous film. The coating fluid can be applied directly to the base porous film, but by subjecting the base porous film to a hydrophilic treatment, coatability is further improved, so that a more homogeneous heat resistant layer (layer B) can be obtained. The hydrophilic treatment is effective particularly when the concentration of water in the solvent is high.

The hydrophilic treatment of the base porous film may be performed by any method, and specific examples thereof include a chemical treatment with an acid or alkali, a corona treatment and a plasma treatment.

The corona treatment has the advantage that the base porous film can be made hydrophilic in a relatively short time, and moreover high coatability can be secured without causing the nature of the interior of the base porous film to be changed because modification of the polyolefin resin by corona discharge is limited to the vicinity of the surface of the film.

The method for removing the solvent from the coating film applied onto the base porous film is generally a method for removal by drying, but the method is not limited thereto.

When the coating fluid is applied onto the base porous film, the temperature for drying the solvent is preferably a temperature that does not cause reduction of the gas permeability of the base porous film, i.e. a temperature that is not higher than a temperature at which shutdown occurs.

<Laminated Porous Film>

The laminated porous film will be described below.

The thickness of the laminated porous film (layer A+layer B) is normally 5 to 80 μm, preferably 5 to 50 μm, especially preferably 6 to 35 μm. When the thickness of the laminated porous film is less than 5 μm, the film is easily broken. When the thickness is excessively large, the electric capacity of the battery tends to be lower when the laminated porous film is used as a separator of the non-aqueous electrolyte secondary battery.

The porosity of the laminated porous film is normally 30 to 85% by volume, preferably 35 to 80% by volume.

The gas permeability of the laminated porous film is preferably 50 to 2000 seconds/100 cc, more preferably 50 to 1000 seconds/100 cc in terms of a Gurley value.

As the value of the gas permeability becomes smaller within the above-mentioned range, a battery, which can show more sufficient ion permeability and cycle characteristics and exhibit higher load characteristics, is obtained when the laminated porous film is used as a separator to produce a non-aqueous electrolyte secondary battery.

The heating shape retention ratio of the laminated porous film at a high temperature at which shutdown occurs is preferably 95% or more, more preferably 97% or more as a value in a MD direction or in a TD direction, whichever is smaller. Here, the MD direction refers to a longitudinal direction during sheet formation, and the TD direction refers to a width direction during sheet formation. The high temperature at which shutdown occurs is a temperature of 80 to 180° C., normally about 130 to 150° C.

The laminated porous film may include porous films other than the base porous film (layer A) and the heat resistant layer (layer B), for example an adhesive film and a protective film etc. within the bounds of not significantly impairing the purpose of the present invention.

The layer B in the laminated porous film has not only high internal uniformity but also high surface smoothness. When a porous film having high surface smoothness is used as a separator of the battery, the film makes close contact with the positive electrode and the negative electrode, and therefore ion permeation during charge-discharge is uniformly conducted, so that lithium dendrite is hard to be generated.

The surface smoothness mentioned herein means a root mean square surface roughness (hereinafter, referred to as rms in some cases). A smaller value of rms means a smoother surface, and the surface smoothness (rms) in the laminated porous film is preferably 0.7 μm or less, more preferably 0.5 μm or less.

The laminated porous film has the advantage that the filler fall-off amount is small. The small filler fall-off amount mentioned herein means that the release strength (hereinafter, referred to as peel strength in some cases) in a T-type peel test using a tape is high or the amount of the heat resistant layer falling off (hereinafter, referred to as a heat resistant layer fall-off amount in some cases) when the film is rubbed against something is small.

The T-type peel test is a method for evaluating principally an interfacial adhesive strength between the layer A and the layer B. Particularly when the laminated porous film is used as a non-aqueous electrolyte secondary battery separator, the layer B easily falls off from the layer A in a step of cutting the film in conformity with the shape of the battery. Therefore, the peel strength of the laminated porous film is desired to be preferably high.

The heat resistant layer fall-off test is a test of causing a filler to fall off from the surface of the layer B by rubbing the surface of the layer B with an object, and is a method for evaluating principally an adhesive strength between fillers of the surface or the interior. When the laminated porous film is used as a non-aqueous electrolyte secondary battery separator, the heat resistant layer fall-off amount is desired to be preferably small because there are many steps in which the film travels on a roll.

<Laminated Electrode Sheet>

The laminated electrode sheet is a sheet which a heat resistant layer forming the layer B and an electrode sheet are laminated. Examples of the electrode sheet include a sheet consisting of a collector carrying an electrode mixture, i.e. a sheet in which an electrode layer consisting of an electrode mixture and a collector are laminated, and in this case, the heat resistant layer is disposed on the surface of the electrode layer in the laminated electrode sheet. Examples of the electrode sheet also include a sheet consisting of an electrode material. The "electrode sheet" is a concept including both the positive electrode sheet and negative electrode sheet described below.

For the positive electrode sheet, usually a sheet in which a positive electrode mixture containing a positive electrode active material, a conductive material and a binder is carried on a positive electrode collector, i.e. a sheet in which a positive electrode layer consisting of a positive electrode mixture and a positive electrode collector are laminated, is used. In this case, the heat resistant layer is disposed on the surface of the positive electrode layer in the laminated electrode sheet. As a specific example, the positive electrode active material is a material capable of being doped and dedoped with lithium ions, the conductive material is a carbonaceous material, and the binder is a thermoplastic resin. Examples of the material capable of being doped and dedoped with lithium ions include lithium composite oxides containing at least one transition metal such as V, Mn, Fe, Co and Ni. Among them, lithium composite oxides having an $\alpha$-$NaFeO_2$ type structure, such as lithium nickel oxide (e.g. $LiNiO_2$) and lithium cobalt oxide (e.g. $LiCoO_2$), and lithium composite oxides having a spinel type structure, such as lithium manganese spinel (e.g. $LiMn_2O_4$), are preferred in that they have a high average discharge potential. Lithium nickel oxide is preferred because cycle characteristics in use with a high capacity are improved.

Lithium nickel oxide may be composite lithium nickel oxide with Ni partially replaced by a substituent element, and an example of the substituent element is at least one metal element selected from the group consisting of Ti, V, Cr, Mn, Fe, Co, Cu, Ag, Mg, Al, Ga, In and Sn. Composite lithium nickel oxide containing a substituent element in an amount of 0.1 to 20 mol % based on a sum of the molar number of the substituent element and the molar number of Ni in lithium nickel oxide is preferred because cycle characteristics in use with a high capacity are improved in the battery obtained.

Examples of the binder include polyvinylidene fluoride, copolymers of vinylidene fluoride, polytetrafluoroethylene, copolymers of tetrafluoroethylene-hexafluoropropylene, copolymers of tetrafluoroethylene-perfluoroalkyl vinyl ether, copolymers of ethylene-tetrafluoroethylene, copolymers of vinylidene fluoride-hexafluoropropylene-tetrafluoroethylene, and thermoplastic resins such as thermoplastic polyimide, polyethylene and polypropylene.

Examples of the conductive material include carbonaceous materials such as natural graphite, artificial graphite, cokes and carbon black. One conductive material may be used alone, or two or more conductive materials (e.g. artificial graphite and carbon black) may be mixed and used.

Examples of the positive electrode collector include Al, Ni and stainless steel, and Al is preferred in that it is easily processed into a thin film and is inexpensive. Examples of the method for carrying a positive electrode mixture on a positive electrode collector to obtain a positive electrode sheet include a method in which press molding is performed, and a method in which an organic solvent is further used to obtain a positive electrode mixture paste, the paste is applied to a positive electrode collector, and dried, and the obtained sheet is pressed to firmly stick a positive electrode mixture to the positive electrode collector. The positive electrode mixture paste contains a positive electrode active material, a conductive material, a binder and an organic solvent.

Examples of the organic solvent include amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide and N-methyl-2-pyrrolidone (hereinafter, referred to as NMP in some cases).

Examples of the negative electrode sheet include a sheet in which a negative electrode mixture containing a negative electrode active material, a binder and a conductive material as necessary is carried on a negative electrode collector, i.e. a sheet in which a negative electrode layer consisting of a negative electrode mixture and a negative electrode collector are laminated. In this case, the heat resistant layer is disposed on the surface of the negative electrode layer in the laminated electrode sheet. As the negative electrode sheet, a sheet consisting of a lithium metal or a lithium alloy can also be used. The negative active material is a material capable of being doped and dedoped with lithium ions, and specific examples include carbonaceous materials such as natural graphite, artificial graphite, cokes, carbon black, pyrolytic carbons, carbon fiber and burned organic polymer materials, and chalcogen compounds such as oxides and sulfides, which can be doped and dedoped with lithium ions at a potential lower than that of the positive electrode. As the negative electrode active material, carbonaceous materials are preferred, and as the carbonaceous material, graphite materials such as natural graphite and artificial graphite are preferred in that they have high potential flatness and a low average discharge potential, so that a high energy density is obtained.

Examples of the negative electrode collector include Cu, Ni and stainless steel, and particularly in the lithium secondary battery, Cu is preferred in that it hardly forms an alloy with lithium and is easily processed into a thin film. Examples of the method for carrying a negative electrode mixture on a negative electrode collector to obtain a negative electrode sheet include a method in which press molding is performed, and a method in which an organic solvent is further used to obtain a negative electrode mixture paste, the paste is applied to a negative electrode collector, and dried, and the obtained sheet is pressed to firmly stick a negative electrode mixture to the negative electrode collector. The negative electrode mixture paste contains a negative electrode active material, a binder and an organic solvent. Here, examples of the binder and the organic solvent include materials similar to those in the positive electrode sheet.

The method for producing a laminated electrode sheet by laminating the layer B on electrode sheets such as the positive electrode sheet and negative electrode sheet include a method similar to the aforementioned method for producing a laminated porous film, i.e. a method in which a coating fluid containing an inorganic filler, a binder resin and a solvent is prepared, and applied directly to the surface of an electrode sheet, and the solvent is removed from the coating.

The layer B in the laminated electrode sheet has not only high internal uniformity but also high surface smoothness. When a laminated electrode sheet having high surface smoothness is used for the battery, the sheet makes close contact with the separator, and therefore ion permeation during charge-discharge is uniformly conducted, so that lithium dendrite is hard to be generated.

The surface smoothness in the present invention has the same meaning as described above, and the rms is preferably 0.7 μm or less, more preferably 0.5 μm or less.

The laminated electrode sheet has the advantage that the filler fall-off amount is small similar to the laminated porous film. Specifically, when the laminated electrode sheet is used as a non-aqueous electrolyte secondary battery electrode, the layer B easily falls off from the electrode in a step of cutting the film in conformity with the shape of the battery. Therefore, the peel strength of the laminated electrode sheet is preferably high. The heat resistant layer fall-off amount is desired to be preferably small because there are many steps in which the film travels on a roll during production of the non-aqueous electrolyte secondary battery.

<Non-Aqueous Electrolyte Secondary Battery>

The laminated porous film and laminated electrode sheet of the present invention can be suitably used as a separator and an electrode in a battery, particularly a non-aqueous electrolyte secondary battery such as a lithium secondary battery.

The non-aqueous electrolyte secondary battery will be described by showing as an example of a case where the laminated porous film and the laminated electrode sheet are used in a non-aqueous electrolyte secondary battery such as a lithium secondary battery, as a suitable usage example thereof, but the usage of the laminated porous film and the laminated electrode sheet is not limited to the example.

While the non-aqueous electrolyte secondary battery includes an electrode group in which a negative electrode sheet, a separator and a positive electrode sheet are laminated, and a non-aqueous electrolyte solution, the non-aqueous electrolyte secondary battery of the present invention includes the laminated porous film or laminated electrode sheet of the present invention in which at least one of the separator, the negative electrode sheet and the positive electrode sheet has the above-described heat-resistant layer (layer B).

A non-aqueous electrolyte secondary battery produced using the laminated porous film of the present invention as a separator has high load characteristics. Even when the battery generates heat, the separator exhibits a shutdown function, and contact between the positive electrode and the negative electrode due to shrinkage of the separator is avoided, so that a non-aqueous electrolyte secondary battery having higher safety is obtained.

A non-aqueous electrolyte secondary battery produced using the laminated electrode sheet of the present invention has high load characteristics. Even when the battery generates heat to cause shrinkage of the separator, contact between the positive electrode and the negative electrode is avoided, so that a non-aqueous electrolyte secondary battery having higher safety is obtained.

The shape of the non-aqueous electrolyte secondary battery is not particularly limited, and examples thereof include a paper type, coin type, a cylinder type, a rectangular shape and a laminate type.

As the non-aqueous electrolyte solution, for example, a non-aqueous electrolyte solution with a lithium salt dissolved in an organic solvent can be used. An example of the lithium salt is one or more compounds selected from the group consisting of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lower aliphatic carboxylic acid lithium salt and $LiAlCl_4$. Among them, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$ and $LiC(CF_3SO_2)_3$ is preferably used as the lithium salt.

As the non-aqueous electrolyte solution, for example, carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; and carbamates such as 3-methyl-2-oxazolidone; sulfur-containing compounds such as sulfolane, dimethyl sulfoxide and 1,3-propanesultone; and compounds in which a fluorine group is introduced into the aforementioned substances can be used, and normally two or more of these compounds are mixed and used.

Among them, one containing carbonates is preferred, and a mixture of a cyclic carbonate and a non-cyclic carbonate or a mixture of a cyclic carbonate and an ether is further preferred. As the mixture of a cyclic carbonate and a non-cyclic carbonate, a mixture containing ethylene carbonate, dimethyl carbonate and ethylmethyl carbonate is preferred in view of wide operation temperature range and high decomposition resistance even when graphite materials such as natural graphite and artificial graphite are used as the negative electrode active material.

EXAMPLES

The present invention will be further specifically described below with reference to examples, but the present invention is not limited to these examples.

In examples and comparative examples, physical properties etc. of a laminated porous film and a laminated electrode sheet were measured using the following methods.
(1) Measurement of Thickness (Unit: μm):

The thicknesses of the laminated porous film and the laminated electrode sheet were measured using a high precision digital length measuring machine manufactured by Mitutoyo Corporation.
(2) Basis Weight (Unit: g/m$^2$):

The laminated porous film and the laminated electrode sheet were each cut to a 10 cm×10 cm square, and the weight W (g) was measured.

The basis weight was calculated in accordance with the equation: basis weight (g/m$^2$)=W/(0.1×0.1). In the case of the laminated porous film, the basis weight of a heat resistant layer (layer B) was calculated by subtracting the basis weight of a base porous film (layer A) from the basis weight of the laminated porous film. In the case of the laminated electrode sheet, the basis weight of the heat resistant layer (layer B) was calculated by subtracting the basis weight of an electrode sheet from the basis weight of the laminated electrode sheet.
(3) Porosity:

The laminated porous film was cut to a 10 cm×10 cm square, and the weight: W (g) and the thickness: D (cm) were measured. The weights of materials in a sample were determined by calculation, the weight: Wi (g) of each material was divided by a true specific gravity to calculate the volume of each material, and the porosity (% by volume) was determined in accordance with the following equation. The basis weight of each material was calculated from the amount and ratio of the material used for film formation.

Porosity (% by volume)=100−[{($W1$/true specific gravity 1)+($W2$/true specific gravity 2)+ . . . +($Wn$/true specific gravity $n$)}/(100×$D$)]×100.

(4) Gas Permeability:

The gas permeability was measured in accordance with JIS P8117 using a digital timer type Gurley type densometer manufactured by TOYO SEIKI SEISAKU-SHO, LTD.
(5) Heating Shape Retention Ratio:

A film was cut out to a size of 8 cm×8 cm, and a 6 cm×6 cm square was written therein, and the film was sandwiched between pieces of paper and placed in an oven heated to 150° C. After 1 hour, the film was taken out from the oven, the dimension of the written square was measured, and the heating shape retention ratio was calculated. The calculation method is as follows.

Length of written line in MD direction before heating: L1
Length of written line in TD direction before heating: L2
Length of written line in MD direction after heating: L3
Length of written line in MD direction after heating: L4
MD heating shape retention ratio (%)=(L3/L1)×100
TD heating shape retention ratio (%)=(L4/L2)×100
(6) SEM Observation of Cross Section:

The laminated porous film and the laminated electrode sheet were subjected to cross section processing by FIB, exposed cross section was observed with SEM at an accelerating voltage of 2 kV and a magnification of 10000, and the diameter of the largest of aggregated particles of the filler (b) of the layer B was defined as a secondary aggregated particle diameter.
(7) Measurement of Surface Smoothness:

The surface smoothness was measured using a confocal microscope PLμ2300. The surface smoothness was shown with a value of mean square surface roughness rms, an index of irregularities.
(8) Peel Test:

Measurement was performed at a peeling rate of 100 mm/minute in accordance with JIS Standard K6854-3 using Scotch Clear Tape from 3M Company as a peeling tape.
(9) Heat Resistant Layer Fall-Off Test Measurement was performed in a surface rubbing test using a kinetic friction tester. One piece of SAVINA MINI-MAX (manufactured by KB SEIREN, LTD.) was attached to a rubbing section (2 cm×2 cm) of the kinetic friction tester, the piece of SAVINA MINIMAX and each of the laminated porous film and the laminated electrode sheet on the heat resistant layer side were kept in contact with each other by applying a weight of 2 kg, and rubbed against each other with five reciprocating motions at a speed of 45 rpm, and the heat resistant layer fall-off amount was determined from a change in weight of the laminated porous film and the laminated electrode sheet at the rubbed section.
<Heat Resistant Layer (B Layer)>

The binder resin and inorganic fillers used for formation of the film B are as follows.
"Binder resin"

Carboxymethyl cellulose (CMC): CELLOGEN 3H manufactured by DAI-ICHI KOGYO SEIYAKU CO., LTD.
"Inorganic filler"

Filler (a1): alumina
Average particle diameter: 0.54 μm
Specific surface area: 4.3 m$^2$/g
Particle shape: nonspherical coupled particles
Filler (a2): alumina
Average particle diameter: 0.42 μm
Specific surface area: 4.8 m$^2$/g
Particle shape: substantially spherical
Filler (b1): alumina
Production method: gas phase method
Average particle diameter: 0.013 μm
Specific surface area: 100 m$^2$/g
Particle shape: substantially spherical Filler (b2): alumina
Production method: solid phase method
Average particle diameter: 0.024 μm
Specific surface area: 70 m$^2$/g
Particle shape: substantially spherical <Base Porous Film (Layer A)>

Seventy (70) % by weight of an ultrahigh molecular weight polyethylene powder (340M manufactured by Mitsui Chemicals, Inc.) and 30% by weight of a polyethylene wax having a weight average molecular weight of 1000 (FNP-0115 manufactured by NIPPON SEIRO CO., LTD.) were provided, and to 100 parts by weight of the ultrahigh molecular weight polyethylene and polyethylene wax were added 0.4% by weight of an antioxidant (Irg1010 manufactured by Ciba Specialty Chemicals Inc.), 0.1% by weight of an antioxidant (P168 manufactured by Ciba Specialty Chemicals Inc.) and 1.3% by weight of sodium stearate. Calcium carbonate having a average particle diameter of 0.1 μm (manufactured by MARUO CALCIUM CO., LTD.) was further added in an amount of 38% by volume based on the total volume, and these components were mixed in a powdered form using a Henschel mixer, followed by melting and kneading the mixture by a twin screw kneader to obtain a polyolefin resin composition. The polyolefin resin composition was rolled by a pair of rolls with a surface temperature of 150° C. to prepare a sheet. The sheet was immersed in an aqueous hydrochloric solution (hydrochloric acid: 4 mol/L, nonionic surfactant: 0.5% by weight) to remove calcium carbonate, and was subsequently stretched at a ratio of 6 at 105° C. to base porous films A1, A2 and A3 consisting of polyethylene.

"A1"
Thickness: 18.5 μm
Basis weight: 7.0 g/m$^2$
Gas permeability: 76 seconds/100 cc "A2"
Thickness: 18.0 μm
Basis weight: 7.0 g/m$^2$
Gas permeability: 87 seconds/100 cc "A3"
Thickness: 17.4 μm
Basis weight: 7.5 g/m$^2$
Gas permeability: 102 seconds/100 cc Example 1

(1) Production of Coating Fluid

A coating fluid of Example 1 was prepared according to the following procedure.

First, CMC was dissolved in a mixed solvent of water and isopropanol (IPA) (water:IPA=90:10 (weight ratio)) to obtain a CMC solution having a CMC concentration of 0.70% by weight (based on [CMC+solvent]).

Then, a filler (a1) and a filler (b1) were added to the CMC solution so as to have a weight ratio of CMC/filler (a1)/filler (b1)=3/95/5, and the mixture was stirred and mixed. The mixed liquid was caused to pass through a Gaulin homogenizer from APV Company (Model 15MR-8TA) by applying a pressure of 60 MPa, so that the filler was dispersed. The operation of causing the liquid to pass by applying a pressure was performed three times to prepare a coating fluid 1. The composition of the coating fluid is shown in Table 1.

(2) Production and Evaluation of Laminated Porous Film

The coating fluid 1 was applied onto the base porous film A1 corona-treated at 50 W/(m$^2$/minute) using a gravure coater, and dried to form a layer B as a heat resistant layer. Then, the layer B was similarly formed on the other surface of the base porous film A1 to obtain a laminated porous film of Example 1 in which the layer B was laminated on both surfaces of the layer A.

The physical properties of the laminated porous film obtained by the above-described method are shown in Tables 2 and 3. The thickness of the layer B is the total thickness of the layers on both the surfaces.

The particle diameter of secondary aggregates of the inorganic filler (b) (0.54 μm) was 1.0 times the primary particle diameter of the inorganic filler (a) (0.54 μm).

Example 2

(1) Production of Coating Fluid

A coating fluid 2 was obtained by the same operation as that in (1) Production of Coating Fluid in Example 1 except that the weight ratio of CMC and the filler was changed to CMC/filler (a1)/filler (b1)=5/95/5. The composition of the coating fluid is shown in Table 1.

(2) Production and Evaluation of Laminated Porous Film

A laminated porous film of Example 2 was obtained by the same operation as that in (2) Production and Evaluation of Laminated Porous Film in Example 1 except that the coating fluid 2 was used as a coating fluid.

The physical properties of the laminated porous film obtained by the above-described method are shown in Tables 2 and 3. The thickness of the layer B is the total thickness of the layers on both the surfaces.

The particle diameter of secondary aggregates of the inorganic filler (b) (0.50 μm) was 0.9 times the primary particle diameter of the inorganic filler (a) (0.54 μm).

Comparative Example 1

(1) Production of Coating Fluid

A coating fluid 3 was obtained by the same operation as that in (1) Production of Coating Fluid in Example 1 except that the filler (b1) was not used and the weight ratio of CMC to the filler was changed to CMC/filler (a1)=2.85/100. The composition of the coating fluid is shown in Table 1.

(2) Production and Evaluation of Laminated Porous Film

A laminated porous film of Comparative Example 1 was obtained by the same operation as that in (2) Production and Evaluation of Laminated Porous Film in Example 1 except that the base porous film A2 as a base porous film and the coating fluid 3 was used as a coating fluid.

The physical properties of the laminated porous film obtained by the above-described method are shown in Tables 2 and 3. The thickness of the layer B is the total thickness of the layers on both the surfaces.

Comparative Example 2

(1) Production of Coating Fluid

A coating fluid 4 was obtained by the same operation as that in (1) Production of Coating Fluid in Comparative Example 1 except that the weight ratio of CMC to the filler was changed to CMC/filler (a1)=5/100. The composition of the coating fluid is shown in Table 1.

(2) Production and Evaluation of Laminated Porous Film

A laminated porous film of Comparative Example 2 was obtained by the same operation as that in (2) Production and Evaluation of Laminated Porous Film in Comparative Example 1 except that the coating fluid 4 was used as a coating fluid.

The physical properties of the laminated porous film obtained by the above-described method are shown in Tables 2 and 3. The thickness of the layer B is the total thickness of the layers on both the surfaces.

Comparative Example 3

(1) Production of Coating Fluid

A coating fluid of Comparative Example 3 was prepared according to the following procedure.

First, CMC was dissolved in a mixed solvent of water and ethanol (ETA) (water:ETA=70:30 (weight ratio)) to obtain a CMC solution having a CMC concentration of 0.60% by weight (based on [CMC+solvent]). Then, a filler (a2) and a filler (b2) were added so as to have a weight ratio of CMC/filler (a2)/filler (b2)=2.85/86/14, and the mixture was stirred and mixed. The mixed liquid was caused to pass through a Gaulin homogenizer from APV Company (Model 15MR-8TA) by applying a pressure of 60 MPa, so that the filler was dispersed. The operation of causing the liquid to pass by applying a pressure was performed three times to prepare a coating fluid 5. The composition of the coating fluid is shown in Table 1.

(2) Production and Evaluation of Laminated Porous Film

The coating fluid 5 was applied onto the base porous film A3 using a gravure coater, and dried to form a layer B as a heat resistant layer. Then, the layer B was similarly formed on the other surface of the base porous film A3 to obtain a laminated porous film of Comparative Example 3 in which the layer B was laminated on both surfaces of the base porous film A3.

The physical properties of the laminated porous film obtained by the above-described method are shown in Tables 2 and 3. The thickness of the layer B is the total thickness of the layers on both the surfaces.

The particle diameter of secondary aggregates of the inorganic filler (b) (3.18 μm) was 7.6 times the primary particle diameter of the inorganic filler (a) (0.42 μm).

TABLE 1

| | Solid charge amount | | | | | Solvent | | | CMC concentration |
|---|---|---|---|---|---|---|---|---|---|
| | Binder | Filler | | | | Solvent composition | | | |
| | CMC Parts by weight | (a1) Parts by weight | (a2) Parts by weight | (b1) Parts by weight | (b2) Parts by weight | Water Weight ratio | IPA Weight ratio | ETA Weight ratio | (vs. solvent + CMC) % by weight |
| Coating fluid 1 | 3 | 95 | — | 5 | — | 90 | 10 | — | 0.70 |
| Coating fluid 2 | 5 | 95 | — | 5 | — | 90 | 10 | — | 0.70 |
| Coating fluid 3 | 2.85 | 100 | — | — | — | 90 | 10 | — | 0.70 |
| Coating fluid 4 | 5 | 100 | — | — | — | 90 | 10 | — | 0.70 |
| Coating fluid 5 | 2.85 | — | 86 | — | 14 | 70 | — | 30 | 0.70 |

TABLE 2

| | Base porous film (layer A) | Coating fluid | Thickness μm | | Basis weight g/m² | | Porosity g/m² | | Gas permeability sec/100 cc | |
|---|---|---|---|---|---|---|---|---|---|---|
| | | | Layers A + B | Layer B | Layers A + B | Layer B | Layers A + B | Layer B | Layers A + B | Layer B |
| Example 1 | A1 | Coating fluid 1 | 25.0 | 6.5 | 16.3 | 9.3 | 59 | 64 | 98 | 22 |
| Example 2 | A1 | Coating fluid 2 | 25.8 | 7.3 | 16.6 | 9.6 | 59 | 66 | 126 | 50 |
| Comparative Example 1 | A2 | Coating fluid 3 | 24.4 | 6.4 | 15.6 | 8.6 | 57 | 66 | 114 | 27 |
| Comparative Example 2 | A2 | Coating fluid 4 | 24.7 | 6.7 | 15.6 | 8.6 | 57 | 66 | 221 | 134 |
| Comparative Example 3 | A3 | Coating fluid 5 | 26.7 | 9.3 | 20.9 | 13.4 | 54 | 62 | 178 | 76 |

TABLE 3

| | Heating shape retention ratio (%) | | Particle diameter of secondary aggregates (μm) | Surface roughness (μm) | Peel strength (N/25 mm) | Layer B fall-off amount (g/m²) |
|---|---|---|---|---|---|---|
| | MD | TD | | | | |
| Example 1 | 99 | 99 | 0.54 | 0.34 | 3.5 | 0.2 |
| Example 2 | 99 | 99 | 0.50 | 0.35 | 7.8 | 0 |
| Comparative Example 1 | 99 | 99 | — | 0.27 | 2.5 | 2.1 |
| Comparative Example 2 | 99 | 99 | — | 0.31 | 3.4 | 0.7 |
| Comparative Example 3 | 99 | 99 | 3.18 | 0.67 | 0.8 | 0.5 |

Example 3

(1) Production and Evaluation of Laminated Electrode Sheet

The coating fluid 1 was applied to a commercial available negative electrode sheet (active material/conductive material/SBR/CMC=85/15/1.5/1.0, base material: electrolytic copper foil) with a bar having a clearance of 100 μm, and dried to form a layer B as a heat resistant layer.

The physical properties of the laminated electrode sheet obtained by the above-described method are shown in Table 4.

The particle diameter of secondary aggregates of the inorganic filler (b) (0.65 μm) was 1.2 times the primary particle diameter of the inorganic filler (a) (0.54 μm).

Comparative Example 4

(1) Production of Coating Fluid

A coating fluid 6 was obtained by the same operation as that in (1) Production of Coating Fluid in Example 1 except that the filler (b1) was not used and the weight ratio of CMC to the filler was changed to CMC/filler (a1)=3/100.

(2) Production and Evaluation of Laminated Electrode Sheet

A laminated electrode sheet of Comparative Example 4 was obtained by the same operation as that in (1) Production and Evaluation of Laminated Electrode Sheet in Example 3 except that the coating fluid 6 was used as a coating fluid.

The physical properties of the laminated electrode sheet obtained by the above-described method are shown in Table 4.

INDUSTRIAL APPLICABILITY

According to the present invention, there are provided a laminated porous film and a laminated electrode sheet which are excellent in dimensional stability at a high temperature and ion permeability and which hardly suffers from fall-off of a filler from a laminated heat resistant layer.

Since a non-aqueous electrolyte secondary battery including the laminated porous film or laminated electrode sheet is capable of suppressing contact between a positive electrode and a negative electrode even when the battery generates heat, the present invention is industrially very useful.

The invention claimed is:

1. A laminated porous film in which a heat resistant layer including a binder resin and a filler and a base porous film including a polyolefin as a principal component are laminated, wherein the filler included in the heat resistant layer substantially consists of an inorganic filler (a) having a primary particle diameter of 0.2 to 1 μm and an inorganic filler (b) having a primary particle diameter of 0.01 to 0.1 μm, and the particle diameter of secondary aggregates of the inorganic filler (b) is not more than 2 times the primary particle diameter of the inorganic filler (a) in the heat resistant layer, the primary particle diameters of the inorganic fillers (a) and (b) are average particle diameters determined by observing the cross section of the heat resistant layer with a scanning electron microscope, the particle diameter of secondary aggregates of the inorganic filler (b) is a maximum particle diameter of the secondary aggregates determined by observing the cross section of the heat resistant layer with a scanning electron microscope,

TABLE 4

| | | Thickness μm | | Basis weight g/m² | | Particle diameter of secondary aggregates (μm) | Surface roughness (μm) | Layer B fall-off amount (g/m²) |
|---|---|---|---|---|---|---|---|---|
| | Coating fluid | Electrode + layer B | Layer B | Electrode + layer B | Layer B | | | |
| Example 3 | Coating fluid 1 | 72.3 | 10.0 | 84.6 | 14.6 | 0.65 | 0.46 | 0.2 |
| Comparative Example 4 | Coating fluid 6 | 71.8 | 9.5 | 85.7 | 15.7 | — | 0.45 | 0.9 | the inorganic filler (a) includes, as a principal component, nonspherical coupled particles in which a plurality of primary particles are partially melted and firmly stuck together by heating, the base porous film is a base porous film that has been subject to hydrophilic treatment, and a peel strength determined at a peeling rate of 100 mm/min in accordance with JIS Standard K6854-3 is 3.5 N/25 mm or more.

2. The laminated porous film according to claim 1, wherein the volume ratio of the inorganic filler (a) to the inorganic filler (b) is 80/20 to 99/1.

3. The laminated porous film according to claim 1, wherein both the inorganic filler (a) and the inorganic filler (b) are alumina.

4. The laminated porous film according to claim 1, wherein the binder resin is a water-soluble polymer.

5. A non-aqueous electrolyte secondary battery comprising as a separator the laminated porous film according to claim 1.

* * * * *